No. 848,003. PATENTED MAR. 26, 1907.
F. W. BRAUNSCHWEIG.
SCREW.
APPLICATION FILED FEB. 21, 1906.
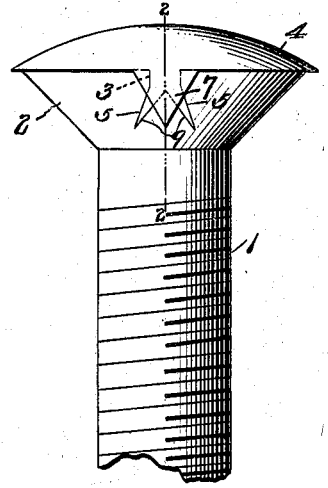
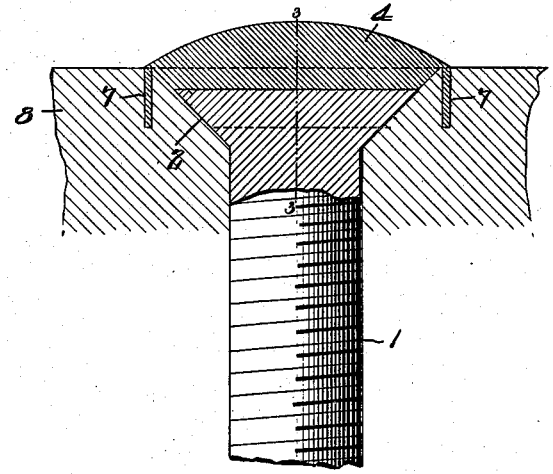
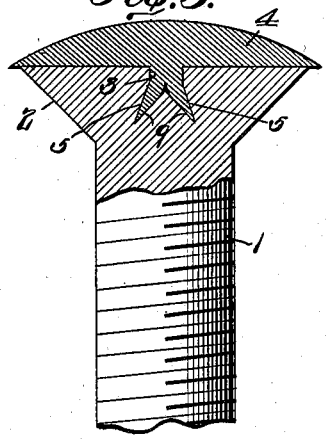
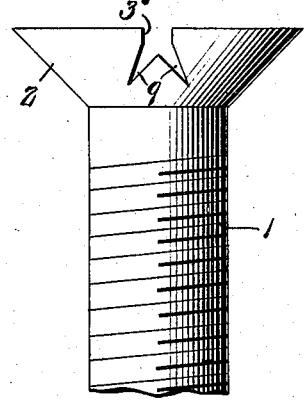
WITNESSES:
Fred W. Braunschweig,
INVENTOR
By C.A. Snow & Co
ATTORNEYS

UNITED STATES PATENT OFFICE.

FRED W. BRAUNSCHWEIG, OF WATERTOWN, WISCONSIN.

SCREW.

No. 848,003.　　　Specification of Letters Patent.　　　Patented March 26, 1907.

Application filed February 21, 1906. Serial No. 302,314.

*To all whom it may concern:*

Be it known that I, FRED W. BRAUNSCHWEIG, a citizen of the United States, residing at Watertown, in the county of Jefferson and State of Wisconsin, have invented a new and useful Screw, of which the following is a specification.

This invention relates to screws, particularly wood-screws, and has for its object to provide for the convenient application of heads, ornamental or otherwise, to the screws after the latter have been set in place, thereby to conceal any disfiguring scratches which are formed upon the work by the driving of the screw. In this connection it is proposed to make use of the usual screw-driver seat in the head of the screw for connecting the cap to the head of the screw.

With these and other objects in view the present invention consists in the combination and arrangement of parts, as will be hereinafter more fully described, shown in the accompanying drawing, and particularly pointed out in the appended claims, it being understood that changes in the form, proportion, size, and minor details may be made within the scope of the claims without departing from the spirit or sacrificing any of the advantages of the invention.

In the drawing, Figure 1 is a side elevation of a screw equipped with the cap of the present invention. Fig. 2 is a sectional view taken on the line 2 2 of Fig. 1, showing the screw set into a piece of work. Fig. 3 is a cross-sectional view on the line 3 3 of Fig. 2. Fig. 4 is a side view of the screw without the cap. Fig. 5 is a side view of the cap.

Like characters of reference designate corresponding parts in all of the figures of the drawing.

In illustration of the present invention there has been shown an ordinary screw 1, having the usual flared head 2 to set down in a countersunk opening, the head being provided, as usual, with the diametrically-disposed groove 3, forming a seat for the reception of the bit of a screw-driver. The cap of the present invention includes a body 4, preferably segmental in shape, with its under side flat and its upper side convexed and smooth or provided with any ornamental configuration. From the under side of the cap depend a pair of parallel substantially diametric bendable ribs 5, the extremities 6 of which are converged downwardly at the same angle as the beveled periphery of the head of the screw. Depending from the edge of the cap and extending across the ends of the ribs 6 are pointed wings 7, which are substantially triangular in shape.

In practice the screw is set into place in the usual manner by a screw-driver, after which the cap is applied to the head of the screw, with its ribs 5 received within the seat 3 and then driven to place, the pointed wings 7 entering the woodwork 8, while the ribs 5 are forced down into the groove 3 and then into the diverging branches 9 at the bottom of the groove, whereby the lower edges of the ribs are spread, and thereby constitute fastenings to hold the cap to the head. The inner walls of the branches 9 meet throughout the longitudinal center of the bottom of the groove 3, and thereby form a beveled deflector, so as to direct the bendable ribs 5 into the proper branches 9. The cap is preferably somewhat greater in diameter than the head of the screw, so as to effectually cover any scratches or other disfigurations upon the work around the head of the screw. By reason of the wings 7 entering the woodwork they operate as braces against twisting strains upon the cap, and thereby aid materially to hold the latter in place and prevent displacement thereof.

Whenever it is desired to remove the screw, a screw-driver bit, knife-blade, or the like may be forced beneath the edge of the cap, and then the latter may be pried up and removed from the screw, so as to uncover the screw-driver seat 3 for use in removing the screw.

Having thus described the invention, what is claimed is—

1. A screw having a screw-driver seat in the head thereof with the bottom of the seat provided with diverged branches, and a cap having a pair of substantially parallel bendable ribs to enter the seat and the branches thereof for connecting the cap to the head.

2. A screw having a tapered head provided with a screw-driver seat, the bottom of which is provided with diverging branches, and a cap having substantially parallel bendable ribs to enter the seat and the branches thereof for connecting the cap to the head, the ribs approximating the diameter of the head and having their ends beveled corresponding to the taper of the head.

3. A screw having a separate cap of greater diameter than the head of the screw and provided with a diametrically-extending rib on the bottom of the cap which engages in the seat of the screw and pointed wings carried by the edge of the cap to be driven into the work.

4. A screw having a diametric screwdriver seat in its head with the bottom of the seat provided with diverging branches, and a separate cap exceeding the diameter of the head and provided with a pair of substantially diametric bendable ribs to enter the seat and the branches thereof to connect the cap to the screw, said cap also being provided with depending pointed wings carried by the edge of the cap at the ends of the ribs to enter the work.

5. A screw having a head provided with a driver's seat formed with locking-walls, of a cap provided with a rib on its bottom adapted to be forced into engagement with the said walls of the screw-driver seat for securing the cap to the screw.

6. A cap for screws comprising a head having a pair of depending substantially diametric parallel bendable ribs.

7. A cap for screws comprising a head having a pair of substantially diametric parallel bendable ribs depending therefrom with the ends of the ribs converged downwardly.

8. A cap for screws comprising a head having a pair of substantially diametric parallel bendable ribs depending therefrom with the ends of the ribs converged downwardly, and pointed wings depending from the edge of the head at the ends of the ribs.

In testimony that I claim the foregoing as my own I have hereto affixed my signature in the presence of two witnesses.

FRED W. BRAUNSCHWEIG.

Witnesses:
GUSTAV BUCHHEIT,
LOUIS FENSKE.